April 18, 1944. G. AINSWORTH 2,346,717
LIGHTING DEVICE
Filed Oct. 28, 1941 10 Sheets-Sheet 1
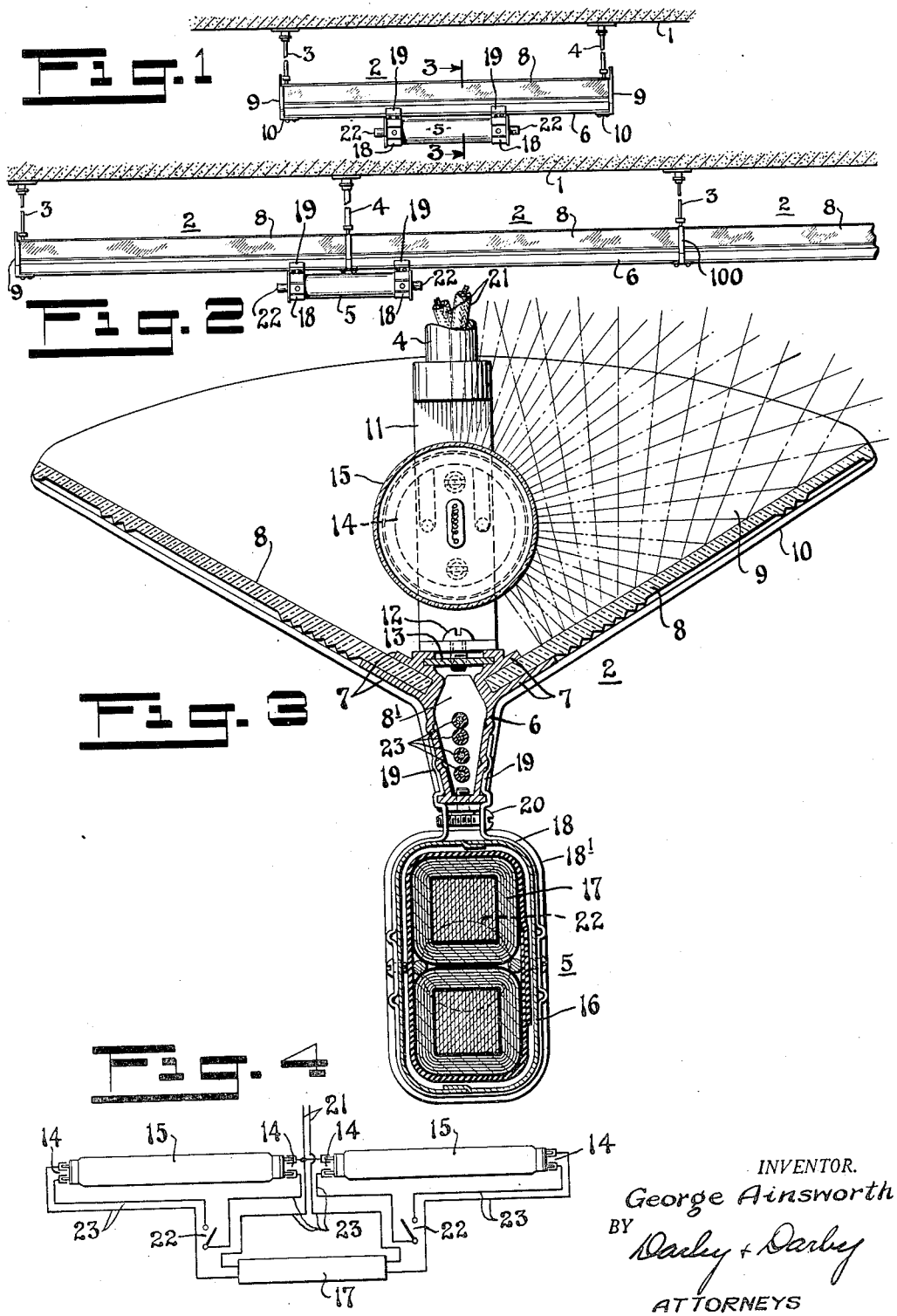
INVENTOR.
George Ainsworth
BY
Darby & Darby
ATTORNEYS

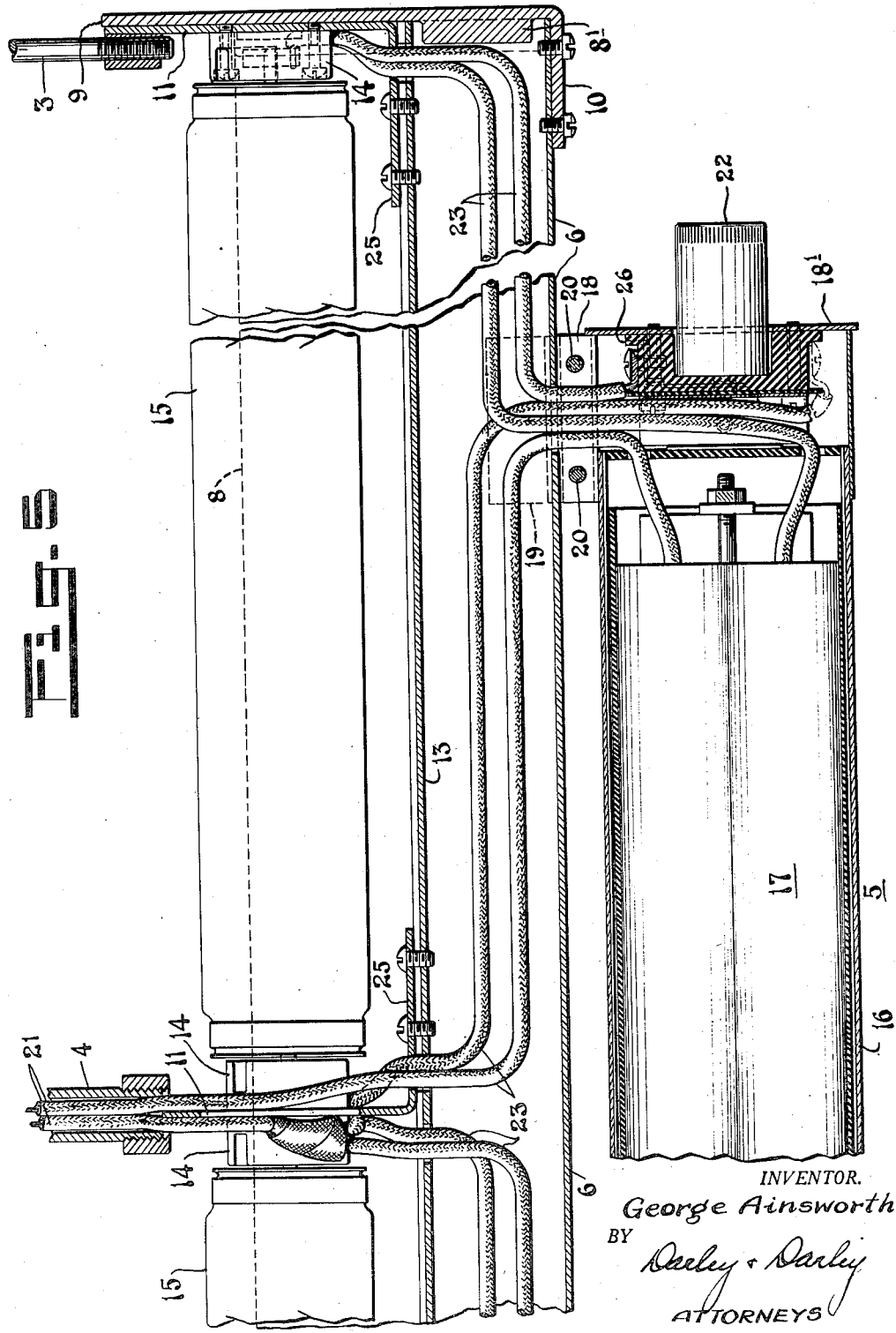

INVENTOR.
George Ainsworth
BY Darby & Darby
ATTORNEYS

April 18, 1944.   G. AINSWORTH   2,346,717
LIGHTING DEVICE
Filed Oct. 28, 1941   10 Sheets-Sheet 4
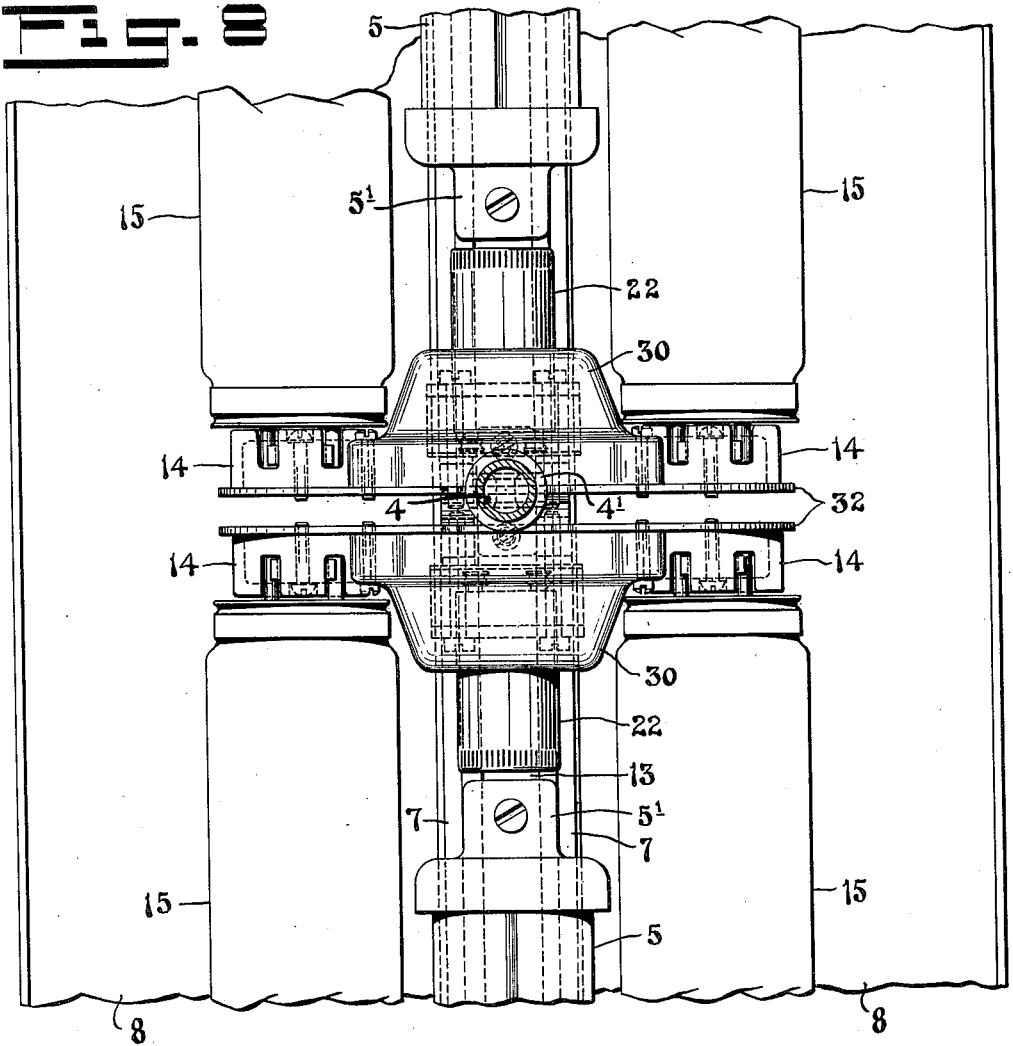
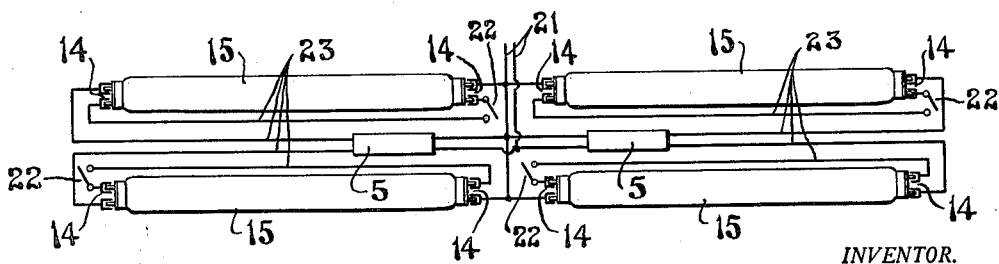
INVENTOR.
George Ainsworth
BY
Darby + Darby
ATTORNEYS

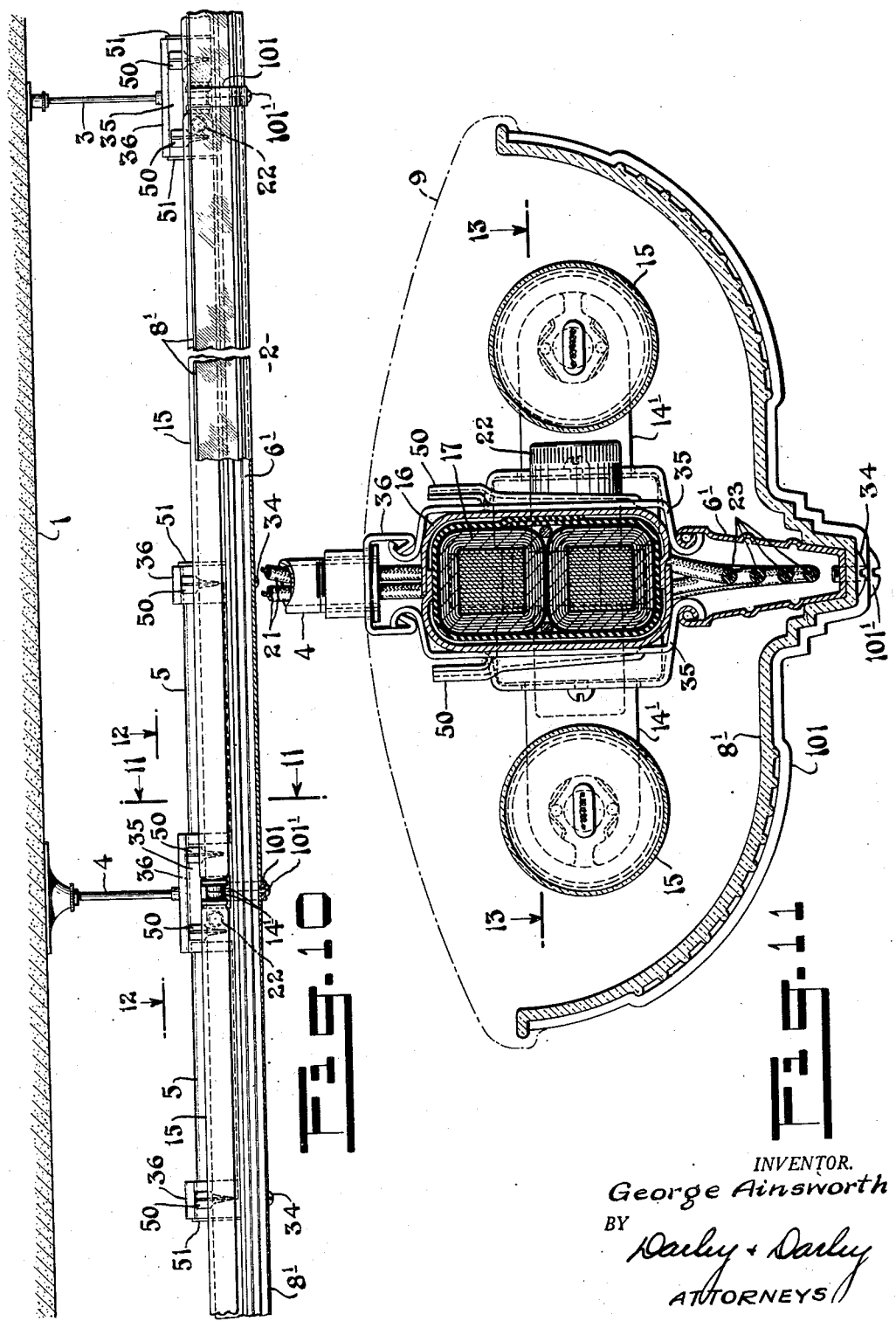

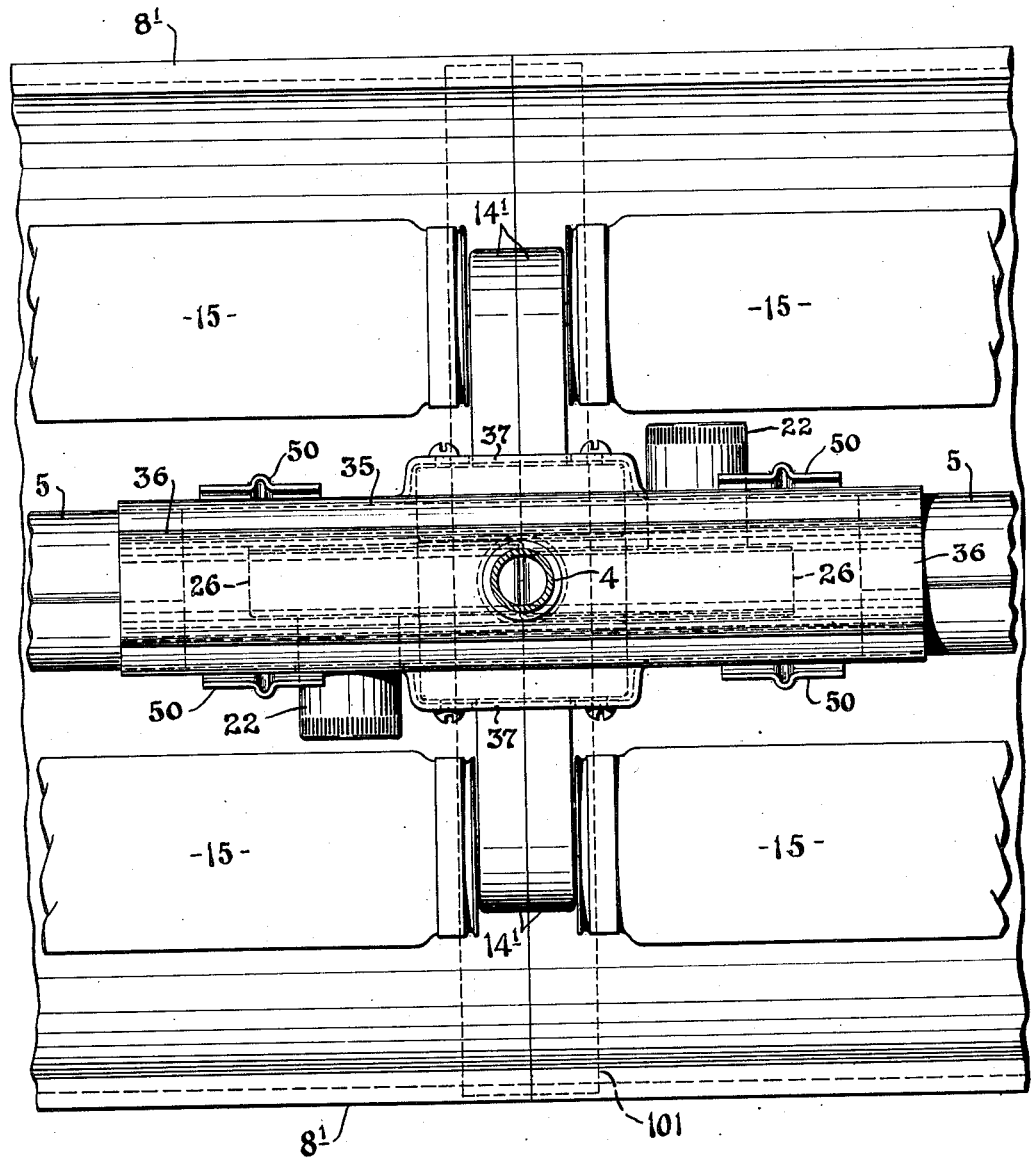

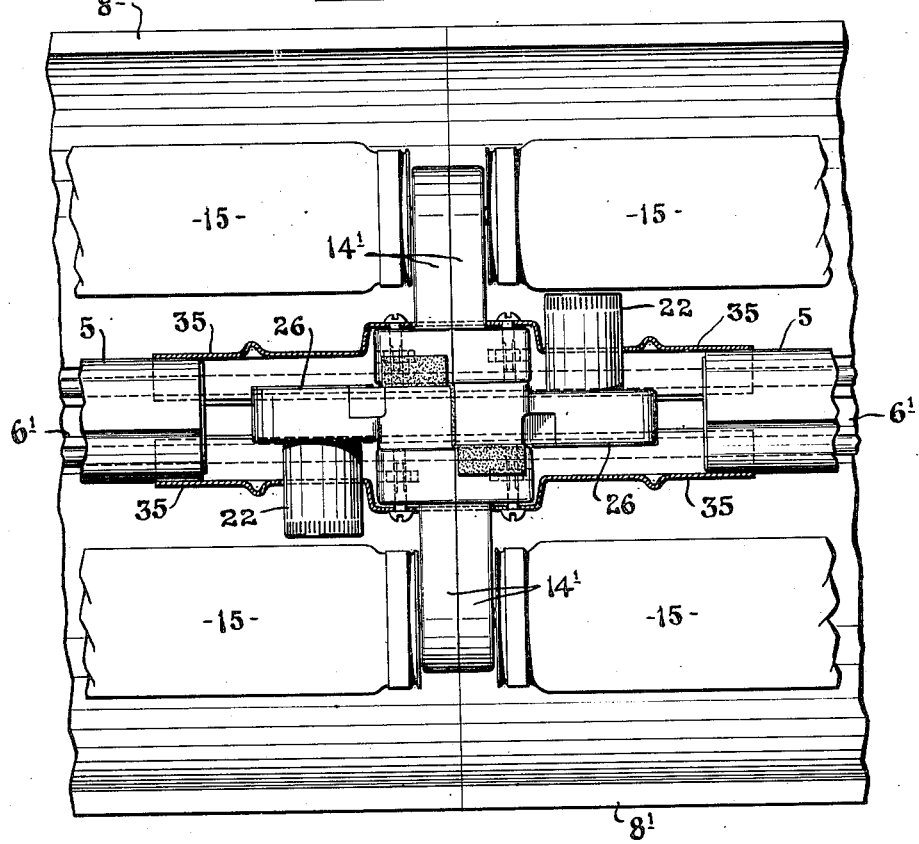
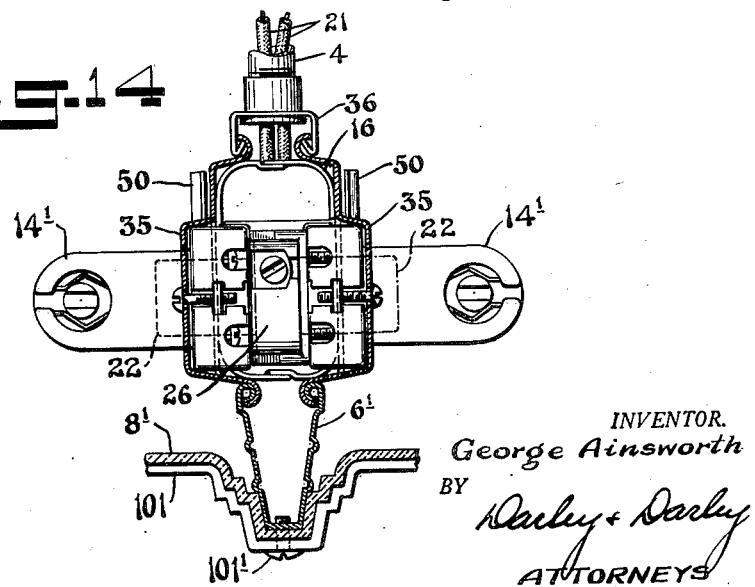

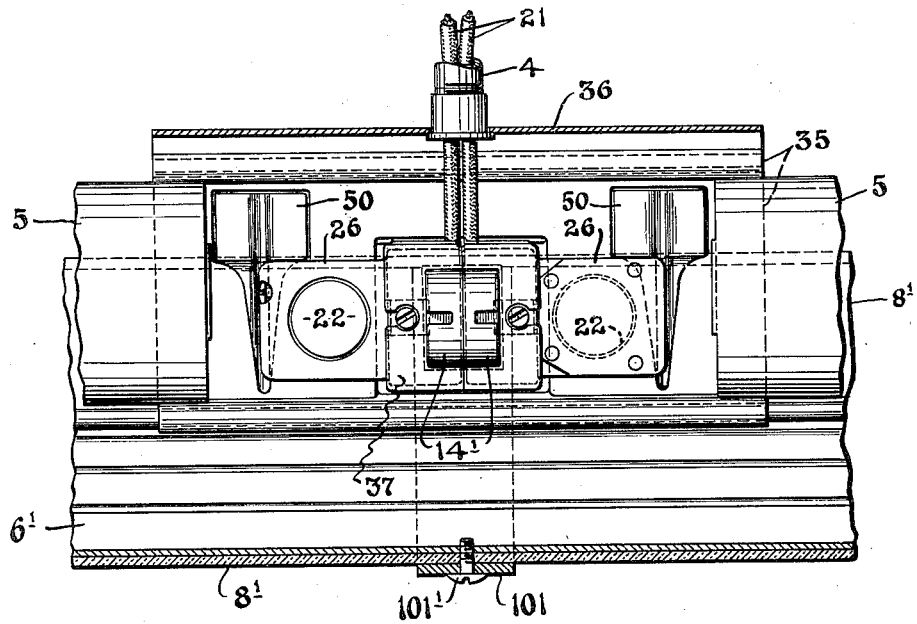
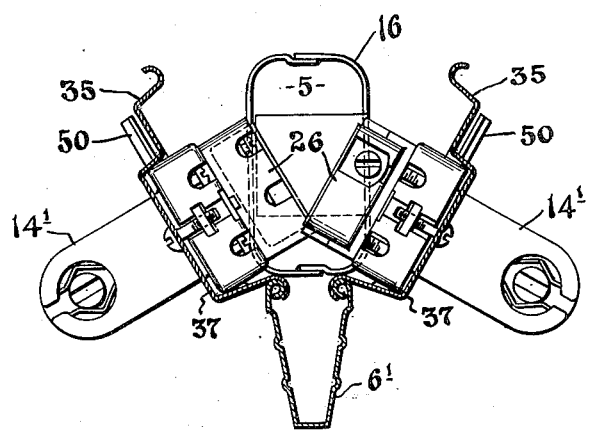

April 18, 1944. G. AINSWORTH 2,346,717
LIGHTING DEVICE
Filed Oct. 28, 1941 10 Sheets-Sheet 9
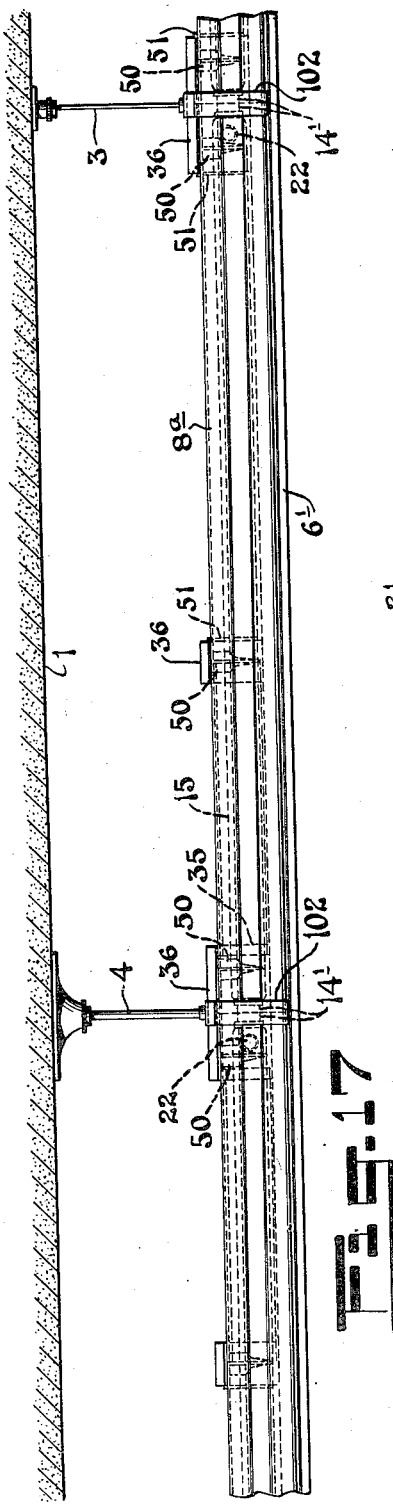
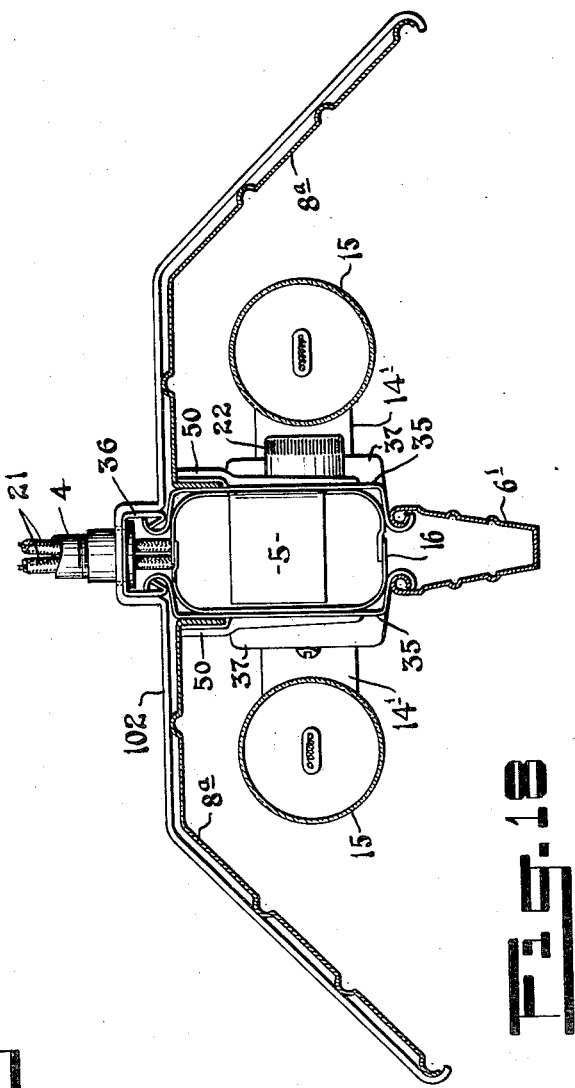
INVENTOR.
George Ainsworth
BY
Darby & Darby
ATTORNEYS

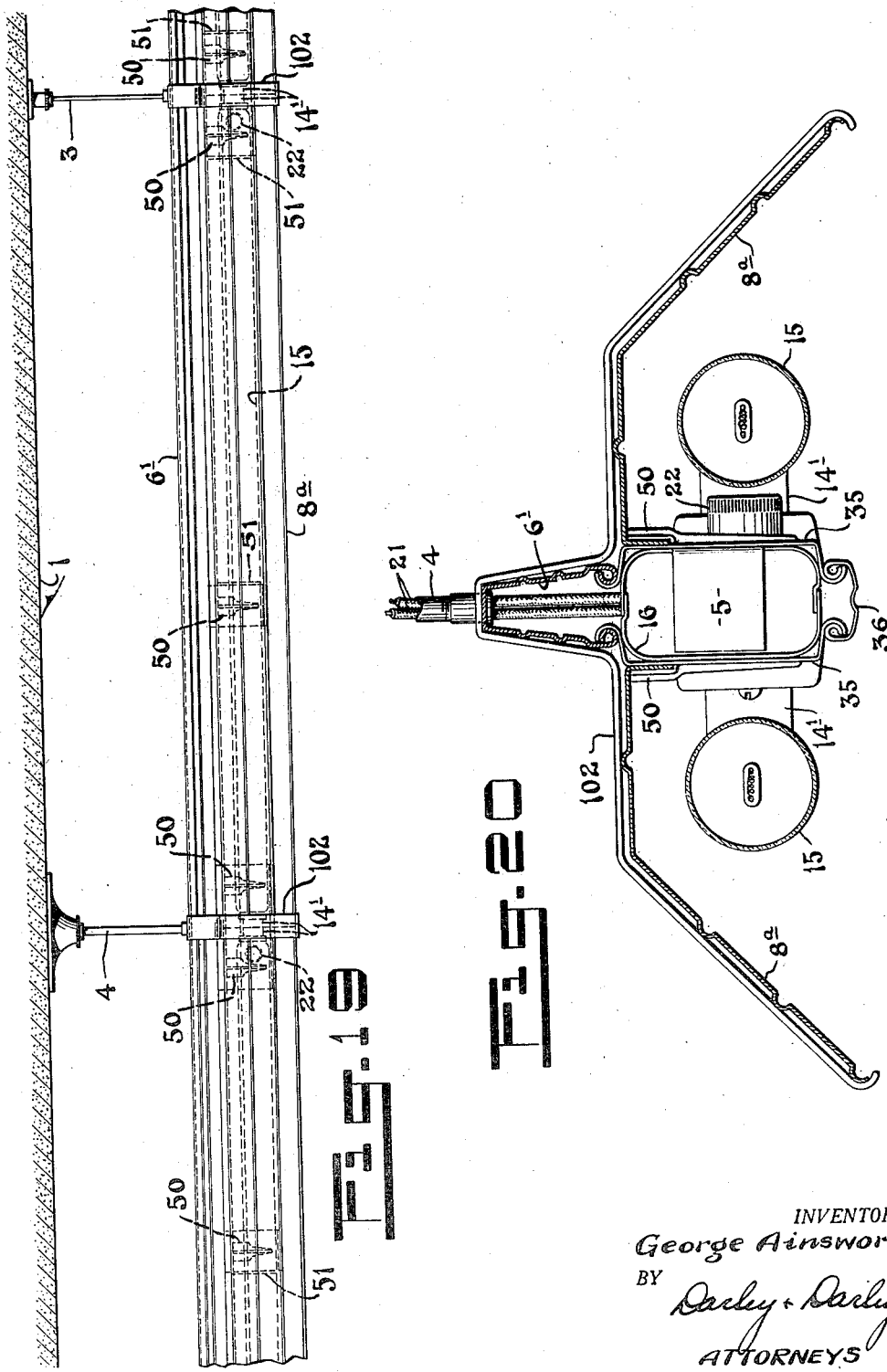

Patented Apr. 18, 1944

2,346,717

UNITED STATES PATENT OFFICE 2,346,717

LIGHTING DEVICE

George Ainsworth, New Hyde Park, N. Y.

Application October 28, 1941, Serial No. 416,798

12 Claims. (Cl. 240—78)

This invention relates to improvements in fluorescent lighting fixtures.

The invention herein disclosed comprises a new, inexpensive by virtue of its small metal and labor content, slender and lightweight fixture for the economical use of fluorescent lighting by means of which entirely diffuse illumination at daylight intensities is secured in such a way as to completely obviate all the shortcomings of glare, physical bulk and costliness of fluorescent fixtures as presently employed.

Its preferred use and most revolutionary accomplishment results from the unique and simple organization of its elements so as to provide an extended and uninterrupted luminous overhead in schools, offices, drafting rooms and libraries. Its proper use in these applications causes diffuse illumination on white papers bearing small details on which the eyes are focused for long periods. Only diffuse reflection is serviceable to comfortable vision. Components of direct light are detrimental to vision. Where a small area of the overhead emits a brightness much in excess of general uniformity such as exists in the natural sky, there occurs an overlay of glare on the retina. This tends to blur the image it is engaging in forming. In the absence of this luminous equilibrium a longer time is required to discern details unless the details are increased in size.

The term "fluorescent lighting" as herein used pertains to the present popular cylindrical lamps from two to five feet or more in length with their accessories. The accessories comprise lamp holders, thermal or glow starter switches, ballast coils, reflector and a wiring system more complicated and bulky than that used in connection with incandescent lighting.

At the present time these accessories are necessary to the use of fluorescent lamps and are involved in the proper starting and operation thereof. They are cumbersome but necessary adjuncts heretofore involving extra metal enclosures and are physically bulky, which must be taken into account in the construction of suitable lighting fixtures of this type. At the present time these accessories are so associated with the lamps as to obstruct and absorb a considerable amount of light, and at the same time increase the physical size and cost thereof. The ballast generates a considerable amount of heat which should be quickly dissipated in order to insure efficient operation of the lamps and against failure of the ballast. On the whole they are unsightly in their present commercial forms.

These encumbrances heretofore were so disposed in the design of fluorescent lighting fixtures that it was impossible to combine high lighting efficiency with a high quality of diffuse or spatial illumination. By the use of the interchangeable elements in this invention positioning the encumbrances so they intercept no upward light has resulted in the entire elimination of sharp shadows and surface brightnesses which are the cause of veiling glare. Veiling glare is that quality of illumination which tends to make black printing on white paper invisible. A harsh glaring effect is inevitable with so-called efficient fixtures of the old art. When these fixtures are made to reduce the glare their efficiency falls very low indeed. There generally exists a profound misunderstanding as to what constitutes good artificial illumination. It is very simple when one considers that high quality is achieved only when it is not contrary to natural lighting conditions at a time of daylight when the quantity of the outdoor light is at a level which can be economically produced indoors. Any artificial illumination having brightness contrasts in excess of those contrasts found outdoors at that level of illumination are undesirable from the point of view of physiological optics.

This invention resides substantially in the combination, construction, arrangement and relative location of parts all as will be explained in full detail hereinafter.

In the accompanying drawings,

Figure 1 is a side elevational view of a lamp fixture in accordance with this invention;

Figure 2 is a similar view showing the adaptation of the fixture of this invention to use with a larger number of lamps arranged end to end in a line, as in the previous case;

Figure 3 is an enlarged cross-sectional view taken on the line 3—3 of Figure 1 looking in the direction of the arrows;

Figure 4 is a diagrammatic circuit view for two of the lamps with their accessories;

Figure 5 is an enlarged side elevational view, with some parts in cross-section, showing the details of construction applicable to either of the fixtures of Figures 1 and 2;

Figure 8 is an enlarged detail plan view of the supporting means for the adjacent ends of the pairs of tubes;

Figure 9 is a diagrammatic circuit view showing the manner of connecting the two pairs of lamps and their accessories;

Figure 10 is a side elevational view, with some parts broken away, of a modified form of construction employing the lamps in pairs and using a different form of reflector and supporting construction;

Figure 11 is a cross-sectional view, taken on the line 11—11 of Figure 10;

Figure 12 is an enlarged top plan view of the structure of Figure 10 viewed from the plane 12—12 of Figure 10;

Figure 13 is a cross-sectional view taken on the line 13—13 of Figure 11;

Figure 14 is a detail view, partly in elevation and partly in section, of the receptacle and ballast structure of the arrangement of Figure 13;

Figure 15 is an enlarged side elevational view of the same structure;

Figure 16 is a view similar to Figure 14 showing the parts opened up for the purpose of making electric connections;

Figure 17 is a side elevational view of a portion of a modified construction employing the essential features of the previous constructions;

Figure 18 is a cross-sectional view of the structure of Figure 17 looking towards one of the supports;

Figure 19 is a side elevational view of a still further adaptation of the essential features of the invention; and Figure 20 is a cross-sectional view of the structure of Figure 19 looking towards one of the supports.

Figure 6:
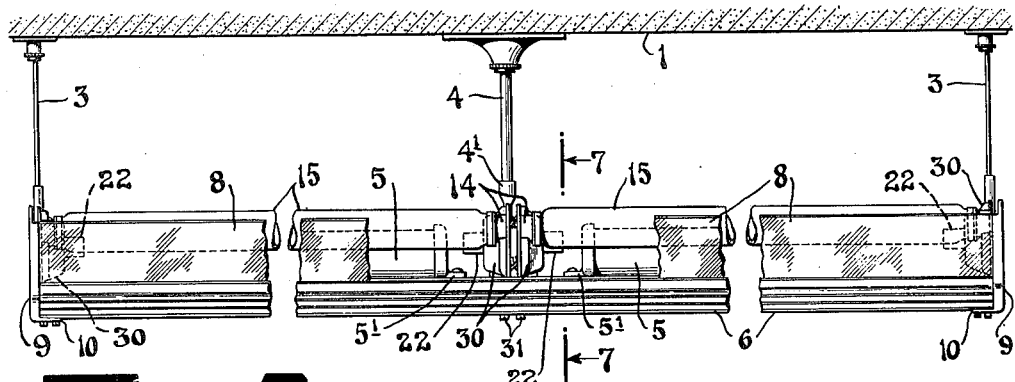
Figure 6 is a side elevational view with some parts broken away showing a fixture for two pairs of lamps arranged end to end, and showing the accessories mounted within the fixture as distinguished from the previous constructions where they are exposed to view.

A detailed description of the structures of the invention will now be set forth. In the various views where it appears, the element represented by the reference numeral 1 is a portion of a suitable surface, such as a ceiling, to which the fixture is to be attached. The fixture is generally designated by the reference numeral 2 and is shown supported from the ceiling by a series of rods and plates 3 and 4. One of these supports, that is the one represented by the reference numeral 4, is in the form of a tube through which the current supply leads 21 from the current source may extend to the lamps. The accessories are generally illustrated by the reference numeral 5 and are shown in the structures of Figures 1 to 5 inclusive as attached to the lower portion of the fixture so as to be exposed to view. This type of arrangement might be termed the "gondola" type. The accessories are housed to efficiently distribute heat and are designed so as to blend with the over-all pleasing appearance of the fixture.

As shown in better detail in Figure 3, the central supporting element, rib or spine of the device is a channel 6 of suitable material such as metal, plastics, and the like. This channel may be produced in accordance with well known manufacturing processes determined largely by the nature of the material. It may, for example, be rolled to form, extruded, cast, or otherwise fabricated. The upper terminal edges of the channel diverge in suitably disposed angular planes and comprise parallel wings 7 which in turn form longitudinal channels extending throughout the length of the main channel. The main channel, as is clear from Figure 3, provides a continuous chamber or housing within which the various circuit wires 23 are enclosed so as to be out of sight and be protected.

The reflectors 8 in this form of the device consist of substantially flat plates diminishing in density toward the upper edge and which lie along their bottom edges in the channels formed by the wings 7. The present invention is not particularly concerned with the nature and construction of the reflectors 8. It suffices to note that they are of any suitable material, whether opaque or translucent, but they are by far preferably of translucent material such as white glass or white plastic so that they distribute by reflection in an upward direction a large percentage of the light impinging thereon onto a wide area of the ceiling over the fixture and they transmit the remaining portion (less that amount absorbed in the reflector) so as to become luminous with a surface brightness which will substantially average into the brightness of the ceiling illuminated thereover.

In accordance with this latter object it will be seen from Figure 3 that the reflectors 8 are of varying cross-section or varying in light transmission and are provided with ribs or fluting so as to compensate for the variations in intensity of light striking them to give them from below an over-all appearance of uniform brightness. The lines also serve to distract the eye from critically appraising an error in graduation. Thus while the major portion of the light flux is used in uniformly lighting the ceiling overhead, which of course should be properly treated for this purpose, the remainder is employed primarily for the purpose of illuminating the reflectors with a light intensity which will cause them to appear to the eye to blend with the ceiling illumination while incidentally the portion of the light transmitted therethrough is used for direct illumination.

In each of the fixtures of Figures 1 and 2, and as clearly shown in Figure 5, the ends of the fixture are provided with plates 9 to which the ends of the channel 6 are attached. The edges of the plates 9 are flanged and have a dependent enlarged central lug, as is best seen in Figure 5. A boss 8' is also formed on the plate 9 and is of suitable configuration so as to nest in the end of the channel 6 which rests on the dependent flanges and is secured thereto by means of screws. The extreme end edges of the reflectors 8 rest on the side flanges 10 to complete the device structurally and give it a finished appearance. Attached to the inner faces of the plates 9 are angle brackets 11 to which the supports 3 and 4 in the case of the single lamp unit are secured for hanging the fixture from the ceiling. The lower arms 25 of the angle brackets 11 are attached by screws 12 to a strip 13 which slides into a longitudinal groove along the top of the channel 6, as is clear from Figure 3. The strip 13 serves to close the channel 6 after the wires are in place and so as to keep out foreign material and to give the device a finished appearance.

At this point it may be noted that in the case of the fixtures employing more than one lamp there extends between the adjacent ends of the lamps, as will be referred to later, a similar angle bracket 11 which is attached to the strip 13 by screws. The upper end of this bracket is provided with a threaded collar to receive the support 4 which in this case is a tube to which the supply leads 21 extend.

The lamp holders for the fluorescent tubes have been indicated by the reference numeral 14. It is noted that the particular details of construction of the holders form no part of this invention. Those illustrated are conventional. As is clear from Figure 5, one of these holders is attached to the end plate 9. In the case of the single lamp unit the holder for the other end of the lamp tube is mounted on the other end plate 9. In the case of a plurality of lamps arranged end to end, a bracket 11 is provided at the adjacent ends of the lamps and the lamp holders 14 are attached thereto in any suitable manner, as for example by means of screws. The lamps have been given the reference numeral 15 in all figures.

The commercially available ballast assembly 17, as illustrated in this form of the device, is enclosed within a commercial case 16. As a part of this accessory there are mounted the starter switch receptacles 26 for the thermal or glow starter switches 22 commonly used with these lamps. The details of construction of the ballast coil, switches, and switch receptacles form no part of this invention, those illustrated being conventional. But their disposition adjacent one another in the gondola make both available for renewal without disturbing any of the assembled fixture is new.

The ballast coil unit is supported from the fixture by means of straps 18 which fit around the ends thereof so that the ends 19 of the straps may be clamped, as is clear from Figure 3, to the channel 6 by means of screws 20. The switch receptacles 26 are mounted on end plates 18' to provide a removable cover to the strap structure 18. The commercial ballast casing is thus exposed directly to the air and is preferably of good heat conducting ability for the efficient radiation of any heat generated, or can be commercially made with heat radiating fins integral with the casing.

By means of this construction it will be seen that the accessories which are liable to electric failure are securely mounted on the fixture and at the same time detachable for servicing, without dismantling any of the other parts of the fixture. They are arranged so as to be exposed to free air circulation to assist heat dissipation and notwithstanding their utilitarian nature are so constructed as to blend in with and contribute to the pleasing appearance of the entire fixture.

Only brief reference is necessary to Figure 4 since it does not illustrate any novel subject matter of this invention. There is merely shown therein, in a diagrammatic way, the various circuit connections employed with a pair of lamps.

Reference will now be made to the construction illustrated in Figures 6, 7, 8 and 9. The feature of this construction is the adaptation of the principles of this invention to use in a fixture where multiple parallel lamps are arranged end to end. A single pair disposed side by side, or a plurality of pairs disposed side by side, so that the individual lamps of each pair are arranged end to end in a line, characterize this form of the invention. In this arrangement, as before, the fixture is suspended by rods, one of which is a tube, and the central channel 6, are employed as before, as well as the reflectors, and plates, and the like.

In this case the receptacle for the lamp holders at the end plates consists of a suitably shaped plate 32 on which the lamp holders 14 are secured by means of screws. The switch receptacle base is likewise mounted on this plate so as to receive the switch 22 (see Figure 7). A suitably shaped cover plate 30 encloses the switch receptacle base and in adjacent portions is complementarily shaped to fit around the lamp holders. The plate 32 is secured on the channel 6 by means of angle brackets 30' which fit in the groove at the top of the channel previously occupied by the strip 13.

Figure 7:
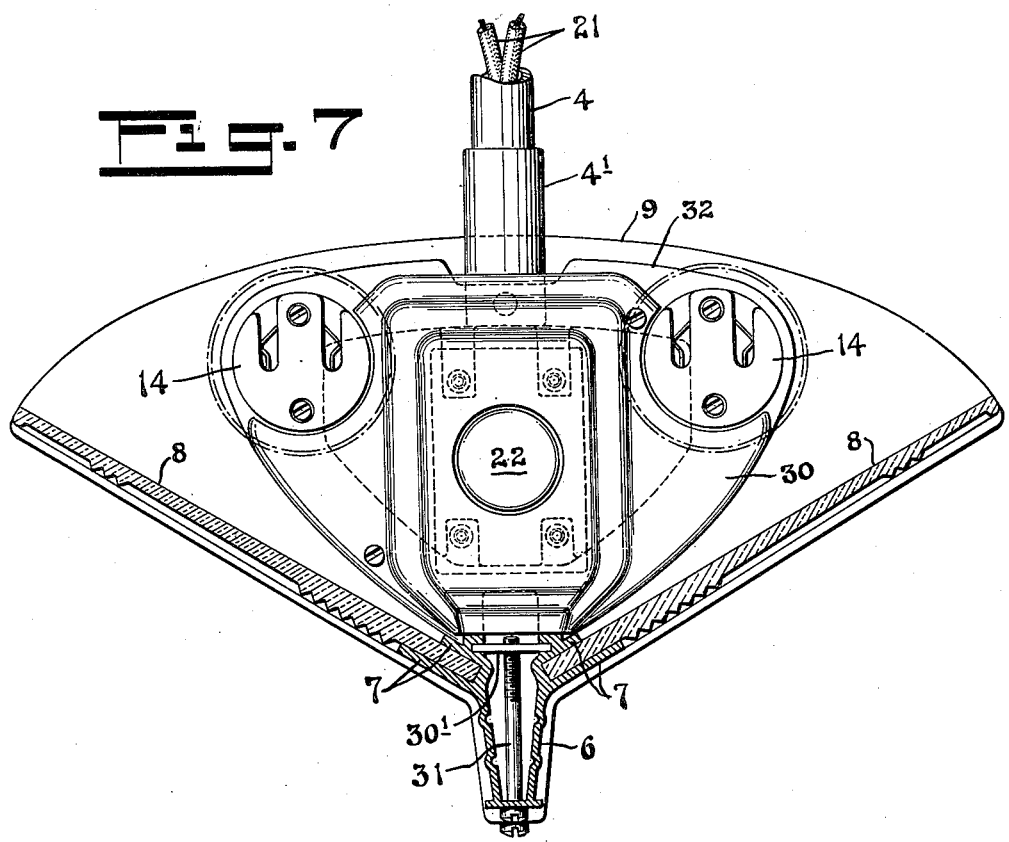
Figure 7 is a cross-sectional view taken on the line 7—7 of Figure 6.

These angle brackets 30' are locked in place by means of screws 31 (see Figure 7). In the case of a single pair of lamps both ends of the fixture would be similarly constructed. In the case of, as illustrated in these figures, where more than one pair of lamps is employed end to end, the adjacent aligned ends are mounted in lamp holders which are supported on a single plate or on two plates like the plate 32, as is clear from Figure 8. The construction of these plates is the same as that previously explained, the covers 30 being employed and the starter switches 22 and lamp holders 14 also being employed. The supports are attached to the channel, as in the case of those of the ends. One of the central pair of supports is provided with a coupling 4' to receive the tubular support 4. In this arrangement the ballast coil unit 5 is mounted just above the channel 6 in an exposed position, between the lamps 15, as appears in Figure 6 as well as Figure 8. These units or ballasts, are held in place by end sockets with feet 5', which are secured to spacer nuts which slide in the groove occupied by the strip 13. If desired, at the points between the various elements the strip 13 may be mounted in the groove as before to close up the wire containing channel 6.

The circuit arrangement for two pairs of lamps is shown in Figure 9 with its various adjuncts. No specific further reference is necessary in view of the fact that this circuit arrangement is conventional.

Figures 10 to 16 inclusive show a modified construction for a fixture using parallel lamps in pairs, as in the previous case, characterized by a different form of reflector arrangement, different form of lamp holders, and a different arrangement for mounting the lamp holders and ballast coil on the channel 6. As in the previous case the channel is employed but at 6' it is somewhat modified in form to give rigidity to a sheet metal section and is simplified in its cross-sectional shape to obstruct less light. In this case, as is clear from Figure 11, the terminal edges of the channel are curled upon themselves to form a pair of longitudinal parallel beads. In this case the reflector 8' is illustrated as a single piece concealing all metal work rather than two plates, and it is given any desired cross-sectional configuration, as illustrated in Figure 11, to suit desired architectural or period styles. It consists of an elongated channel-like member, made of any suitable material, as in the previous case, preferably translucent, and is shaped to fit along the bottom of and nest with the lower edge of the channel 6'. It is secured at suitable points to the channel by means of the screws 34. In elongated fixtures where several lengths of reflector are employed, the ends may be simply lap jointed, or, as illustrated, they may abut and the joint therebetween may be covered by means of a complementarily shaped strip member 101 which is secured to the channel by the screw 101'. The ballast coil unit 5 comprising the coil 17 within its housing shell 16, is as in the previous case mounted within the fixture between the lamps. In this case, however, it is not attached to the fixture by means of screws, but is secured in a clamp comprising a pair of hinge plates 35. The lower edges of the plates 35 are reversely curved so as to fit around the beads at the top of the channel 6'. The plates clamp around the ballast unit and at their upper ends are reversely curved in exact duplication of their bottom edges as clearly shown in Figure 11, to engage the gripping edges of a suitably shaped gripping channel 36 through which extends a flanged bushing to which the tubular support 4 is attached. A similar construction is obviously used at the points where the solid supporting rods 3 are employed. The plates 35 are thus clamped tightly together about the ballast unit 5 and serve by means of the channel 36 to cooperate in supporting the entire fixture from the overhead rods.

As is clear from Figures 12 and 13, the ends of a pair of ballast units 5 are secured between the ends of the double plate clamp 35, as previously described. The plates 35 are symmetrically formed about the vertical center line of the offset housing 37 having a porthole as shown in Figure 15, and thus provide a very compact yet accessible housing for the lamp holders 14' which can be of the conventional commercial construction and do not by themselves form any part of this invention. But their organization between the plates is novel. Within any pair of plates 35 four of these lamp holders 14' are clamped in compact formation to reduce distance between the axes of the tubular lamps 15. Mounted on a diagonally alternate pair of these lamp holders are the receptacles 26 for the switches 22. The lamp holders are arranged in pairs so as to extend in diametrically opposite directions so as to be properly positioned to receive the lamps 15, as is clear from Figures 12 and 13. The plates 35 have "blisters" or clips 50 extending in pairs equally spaced with respect to the porthole of housing 37, as is clear from these drawings, the function of which will be described later. In the form of the assembly of parts illustrated in these figures these clips have no function except to release heat from the enclosure.

It will be apparent that by means of this construction all the accessories are readily attached in proper groups on the channel 6' so as to support the lamp holders, ballast units, switch receptacles, and switches in a compact group, without the use of screws and screw holes, notwithstanding any possible length of tubular lamp. As is clear from Figure 10, a similar hinge plate construction 36, of smaller size, is provided to support the outer ends of the ballast units 5 and attach them to the channel 6' at any convenient point without screw holes or screws. Cover plates 51 are snapped between the narrow plate clamps 36 to cover the wiring and seal off the end of the unit. At these outer ends provision, of course, is not necessary for switch receptacles and switches, as they are combined with the commercial lamp holders and project through portholes in the full length plates 35.

Figure 16 illustrates the advantage of a construction of this type at the time of making the circuit connections to the lamp holders and supply wires, or in the case of repair or replacement of parts. The clamping channels 36 are slipped off so that the plates 35 may be opened outwardly on a hinge, like the covers of a book, as illustrated in Figure 16, to expose all of the parts within the housing formed by the plates 35 and to release the ballast coils in the event of replacement. As is clear from Figure 13, the starter switches 22 may be replaced without the necessity of opening these strap housings. As is clear from Figure 16, the lamp holders are attached to the plates forming the housing by means of their regular screws. At the two ends of the fixture a similar construction is employed, but it is of smaller and simpler construction in view of the fact that only a pair of lamp holders are needed to support the adjacent ends of the terminal pair of lamps.

As will be apparent to those skilled in the art, all of the previously described embodiments of the invention completely screen the lamp from below to a special degree as required for spatial diffuse illumination. The constructions shown in the remaining figures illustrate the great economy of this invention. The same elemental series of parts comprised in the invention can easily be applied to direct illumination where such is desired on account of conditions of application. The same basic elements can be hung up and the character of the lighting reversed simply by changing the reflectors.

In the arrangement of Figures 17 and 18, the main details of construction are the same as that of Figures 10 to 16 inclusive. The modified channel 6' is employed and the various accessories are secured thereto, as in the previous case. In this arrangement, however, the reflector 8a, which in this case is preferably opaque with high reflecting ability, and made of any suitable material, is not of a single piece construction, but comprises two similar parts which are flanged along one edge to fit down in the projecting blisters or clips 50 on the sides of the plate parts 35. These clips 50 were previously referred to as having no utility in the previous adaptation but here serve to support the inner edges of the reflector parts 8a in the direct lighting type.

It will be noted that there is a space along the top between the reflectors so as to allow some light to escape and light up the overhead to reduce the total gloom that would result from no opening.

At the joints between the ends of longitudinally arranged reflector sections a suitably shaped strap 102 is provided which covers the joint and also serves to support the lower edges of the reflector sections in the region thereof. The arms of the strap 102 are sprung over the edges of the reflector sections so as to hold them in place. The center of the strap is offset, as shown in Figure 18, and fits over the flanged coupling member to which the tube 4 is secured to support the fixture. A similar arrangement is used, as shown in Figure 17, at the solid rod supports. This offset central portion also nests around the C-shaped channel 36. The construction of the parts is otherwise the same.

The construction in Figures 19 and 20 serves to further illustrate the versatility of the novel subject matter of this invention. In this case the channel 6', instead of being at the bottom of the unit as in the previous case, is at the top, and the various accessories depend therefrom and are attached thereto as in the two previous constructions. This structure is a direct lighting fixture structure and the reflector sections 8a are supported in the clips 50 as before. The strap 102 is used at the joints but its central offset portion is shaped to nest with the channel 6', as is clear from Figure 20. It may be noted, as illustrated in the drawings, that in these various elongated constructions the straps which cover the butt joints between the reflector sections occur at the supports. To state it another way, the reflector sections are long enough to extend between the center lines and supports so that the straps at the butt joints occur at the supports. This is not a necessary construction but a desirable one. It will be noted that in the construction of Figures 19 and 20 the gripping channel clamp 36 is now at the bottom and as indicated in Figure 20 it may be suitably decorated to give a finished appearance in view of the fact that it is exposed to view.

The various objects of the invention it is believed will now be apparent to those skilled in physiological optics. A fixture is provided with such a small amount of material relative to all other fixtures adapted for fluorescent lamps that it is able to distribute light on the ceiling without any obstruction whatever. The entire metal work is of very small size and placed entirely below the lamp. In its preferred form it is utterly impossible that any brightness can be reflected from papers on the desk which is caused by an overhead brightness in excess of that brightness on the ceiling. This is extremely agreeable to the eyes. Notwithstanding its slight construction it is adequately strong and rigid for the application of any number of tubular lamps end to end. The elements comprising the structure contain no more metal than is absolutely necessary for their functions, and they are formed so that a pleasing appearance is obtained without additional non-functional elements. In all cases the relatively slender central spine is employed which forms a housing for the circuit wires, as well as support for all other elements. Any electrician having a stock of parts can assemble them in various types of fixtures for various lengths of lamps to any overall length desirable for the area to be lighted. All parts liable to electrical deterioration are so simplified as to offer ready access and can be separately removed without taking down the lighting fixture. In the construction of the various fixtures no parts are soldered or welded together, and only a screw driver is necessary to remove the standard parts commercially made to be attached with screws.

As an example of the simplicity of the construction, it will be seen that the arrangement of Figures 1 to 9 is so constituted that the various reflector sections can be quickly removed for cleaning and replacement by simply slipping the various reflector plates out of their seats.

In the construction of Figures 10 to 16 inclusive the reflector sections are easily removed by simply removing screws 34 and 101' for cleaning and replacement. Ready access to the accessories by reason of the construction employed in this form has already been explained.

In the arrangement of Figures 17 to 20 inclusive the reflector sections can be easily removed for cleaning and replacement by springing the arms of the straps 102 outwardly and then moving the entire strap upwardly on its associated support so that the reflector sections can be lifted out of the supporting clips 50.

The constructions illustrated are pleasantly decorative and may be readily modified to suit various decorative schemes. The opaque parts are of such small size and arrangement that they provide a minimum of interference with the lighting function of the fixture. This results in the highest light output efficiency ever obtained for a fluorescent fixture, which has the most desirable ability of providing entirely diffuse illumination with no possibility whatever of an intrinsic brightness greater than the ceiling brightness. A minimum amount of material is employed, particularly of metal parts, since in most respects the fixture is adapted to manufacture not only from metal but from various commonly used substitutes therefor.

From the above description it will be apparent to those skilled in the art that the novel subject matter herein disclosed may be embodied in various physical forms the facility for which has been indicated by the diversity of adaptation herein set forth. I do not therefore desire to be strictly limited to the disclosure as given for purposes of illustration, but rather to the scope of the claims granted me.

What is claimed is:

1. A fluorescent lighting fixture for tubular lamps consisting of an elongated channel support, reflecting means detachably secured to said channel support, lamp holders, lamp accessories, and clamping means for detachably securing the holders and accessories to said channel member, said clamping means comprising a pair of straps each engaging the edges of the channel at one end and engaged at the other end by a binder clip.

2. A fluorescent lighting fixture comprising a slender open top longitudinal support member extending throughout the length of the fixture, an open sided reflector removably attached to one side of said member, lamp holders for a fluorescent lamp, auxiliary devices including a ballast, conductors interconnecting said holders and auxiliaries and lying wholly within said member, and detachable clamping members engaging the open top of said support member for removably securing said holders and auxiliaries as a unit to said member so as to lie on the side of said member opposite the point of attachment of the reflector thereto and substantially in the axial plane of said support member and reflector, whereby the auxiliaries lie completely outside of said member.

3. A fluorescent lighting fixture combination comprising symmetrical individual lighting fixtures arranged end to end including aligned open top longitudinal slender channel-shaped support members extending throughout the length of the fixture combination and each individual fixture including an open sided reflector removably attached to one side of said member, lamp holders, lamp auxiliaries, conductors lying wholly within said member for interconnecting said holders and auxiliaries, detachable clamping means for attaching said holders and auxiliaries to said member in units lying on the lamp holder side of said member outside said member and within the reflector, and means attached to said attaching means for mounting said fixture in spaced relation to a supporting surface.

4. A fluorescent lighting fixture of the type described including a hollow open top supporting member extending throughout the length of the fixture, an open top reflector detachably secured to the bottom of said member, lamp holders, lamp auxiliaries, conductors lying wholly within said member for interconnecting said holders and auxiliaries, and means for detachably connecting said holders and auxiliaries to the top edge of said member so as to lie above the level thereof and within said reflector.

5. In the combination of claim 4, said lamp holders being arranged in oppositely projecting pairs so that the auxiliaries lie between the lamps when mounted in said holders.

6. A fluorescent lighting fixture comprising an open top longitudinal support member extending throughout the length of the fixture, an open sided reflector removably attached to one side of said member, lamp holders secured to the opposite side of said member so as to be within the reflector, an auxiliary unit including a ballast secured to said member on the lamp holder side and exteriorly thereof, conductors interconnecting said holders and unit and lying within said member, and means secured to said member for attaching the fixture to a support in spaced relation thereto, said lamp holders and unit being attached to said member by a pair of clamping plates hingedly engaging the top edges of said member.

7. A fluorescent lighting fixture comprising an open top longitudinal support member extending throughout the length of the fixture, an open sided reflector removably attached to one side of said member, lamp holders for a fluorescent lamp, auxiliary devices including a ballast, conductors interconnecting said holders and auxiliaries and lying wholly within said member, means for securing said holders and auxiliaries as a unit to said member so as to lie on the side of said member opposite the side of attachment of the reflector thereto, whereby the auxiliaries lie completely outside of said member, said securing means comprising pairs of plates engaging the edges at the open side of said member, and means for securing said plates together in clamping relation.

8. A fluorescent lighting fixture comprising an open channel longitudinal support member, an open sided reflector removably supported at one side of said longitudinal support, a pair of clamping plates hingedly engaging the edges of said member, a pair of oppositely facing lamp holders supported by said plates, auxiliaries for the lighting fixture, said auxiliaries being held at their ends by said plates when closed to clamping position, and means for securing said plates together to hold the lamp holders and auxiliaries in position.

9. A fluorescent lighting fixture combination comprising symmetrical individual lighting fixtures arranged end to end including abutting open top longitudinal support members extending throughout the length of the fixture combination and each individual fixture including an open sided reflector removably attached to one side of said member, lamp holders, lamp auxiliaries, conductors lying wholly within said member for interconnecting said holders and auxiliaries, a pair of plates hooking over the top edges of said member and partially surrounding said holders and auxiliaries, and means for clamping said plates about the holders and auxiliaries.

10. A fluorescent lighting fixture comprising an open top longitudinal support member extending throughout the length of the fixture, an open sided reflector removably attached to one side of said member, lamp holders for a fluorescent lamp, auxiliary devices including a ballast, conductors interconnecting said holders and auxiliaries and lying wholly within said member, pairs of clamping plates engaging the edges of said member and partially enclosing said auxiliaries, a removable sliding channel having means to grip the upper edges of said plates to hold them in clamping relation, and connecting means attached to said removable sliding channel for supporting the fixture from the ceiling.

11. A fluorescent lighting fixture comprising an open sided reflector, an open longitudinal support member having offset edges lying in the plane of the axis of said reflector, said reflector being removably supported by said member, a pair of clamping plates hingedly engaging the offset edges of said longitudinal support, a pair of oppositely facing lamp holders supported in each plate, auxiliaries for the fixture, said auxiliaries being clasped at one end by said plates when closed to clamping position, and means for securing said clamping plates together to hold the lamp holders and the auxiliaries in position.

12. A fluorescent lighting fixture of the type described including a slender elongated hollow supporting member extending throughout the length of the fixture, an open top dense translucent reflector detachably secured to the bottom of said member, lamp holders, lamp auxiliaries, conductors lying wholly within said hollow member for interconnecting said holders and auxiliaries, means for detachably mounting said holders and auxiliaries on top of said member so as to lie above the level and along the axis thereof, and means for supporting the fixture in spaced relation to a supporting surface, said holders and auxiliaries being arranged with respect to fluorescent lamps when mounted in said holders so as to expose the lamps over the major portion of the area thereof for direct radiation to a surface above the holder and to the reflector and the density of the reflector being such that it transmits and reflects the received light in such proportions that the surface brightness of the outer face of the reflector will substantially average into the brightness of the illuminated surface above the fixture.

GEORGE AINSWORTH.